US009118728B2

(12) United States Patent
Diab et al.

(10) Patent No.: US 9,118,728 B2
(45) Date of Patent: Aug. 25, 2015

(54) METHOD AND SYSTEM FOR DETERMINING PHYSICAL LAYER TRAVERSAL TIME

(75) Inventors: Wael William Diab, San Francisco, CA (US); Scott Powell, Newport Beach, CA (US)

(73) Assignee: Broadcom Corporation, Irvine, CA (US)

( * ) Notice: Subject to any disclaimer, the term of this patent is extended or adjusted under 35 U.S.C. 154(b) by 1198 days.

(21) Appl. No.: 12/480,658

(22) Filed: Jun. 8, 2009

(65) Prior Publication Data

US 2010/0228872 A1 Sep. 9, 2010

Related U.S. Application Data

(60) Provisional application No. 61/157,435, filed on Mar. 4, 2009.

(51) Int. Cl.
*H04L 29/06* (2006.01)
*H04L 29/08* (2006.01)

(52) U.S. Cl.
CPC .............. *H04L 69/28* (2013.01); *H04L 69/323* (2013.01)

(58) Field of Classification Search
CPC ................... H04L 12/40013; H04L 12/40032; H04L 43/0852; H04L 47/10; H04L 47/283
USPC .................................................. 709/224, 250
See application file for complete search history.

(56) References Cited

U.S. PATENT DOCUMENTS

| | | | | |
|---|---|---|---|---|
| 5,740,174 A * | 4/1998 | Somer | ........................... | 370/402 |
| 6,023,476 A * | 2/2000 | Lo | .................. | 370/502 |
| 6,061,362 A * | 5/2000 | Muller et al. | .................. | 370/463 |
| 6,085,248 A * | 7/2000 | Sambamurthy et al. | ...... | 709/229 |
| 6,118,787 A * | 9/2000 | Kalkunte et al. | .............. | 370/445 |
| 6,222,825 B1 * | 4/2001 | Mangin et al. | ................ | 370/235 |
| 6,292,517 B1 * | 9/2001 | Jeffress et al. | ................ | 375/287 |

(Continued)

FOREIGN PATENT DOCUMENTS

| | | |
|---|---|---|
| EP | 1 473 870 | 11/2004 |
| EP | 1 484 876 | 12/2004 |

(Continued)

OTHER PUBLICATIONS

Wikipedia, Media Independent Interface, p. 1-10.*

(Continued)

*Primary Examiner* — Backhean Tiv
(74) *Attorney, Agent, or Firm* — Oblon, McClelland, Maier & Neustadt, L.L.P.

(57) ABSTRACT

Aspects of a method and system for determining physical layer traversal time are provided. In this regard, duration of a time interval may be determined in the PHY of a network device, where the time interval corresponds to an amount of time that occurs between a first time instant at which information is input to the PHY and a second time instant at which corresponding information is output by the PHY. Communication of data to and/or from the network device may be managed based on the determined duration of the time interval. The duration of the time interval may be determined utilizing one or more counters within the PHY. The determined duration may be stored in one or more registers within the PHY. An amount of data that is processed by the PHY during the time interval may be determined within the PHY.

20 Claims, 6 Drawing Sheets

(56) References Cited

U.S. PATENT DOCUMENTS

| | | | |
|---|---|---|---|
| 6,603,739 B1* | 8/2003 | Dubuc | 370/232 |
| 6,925,077 B1* | 8/2005 | Acharya | 370/362 |
| 7,113,182 B2* | 9/2006 | Low et al. | 345/204 |
| 7,302,269 B1 | 11/2007 | Crawford et al. | |
| 7,359,401 B2* | 4/2008 | Osawa et al. | 370/462 |
| 7,688,749 B1* | 3/2010 | Lo | 370/252 |
| 2001/0043603 A1* | 11/2001 | Yu | 370/393 |
| 2001/0050659 A1* | 12/2001 | Sato et al. | 345/5 |
| 2002/0039371 A1 | 4/2002 | Hedayat et al. | |
| 2002/0159400 A1* | 10/2002 | Park et al. | 370/282 |
| 2003/0110344 A1* | 6/2003 | Szczepanek et al. | 711/100 |
| 2003/0198255 A1* | 10/2003 | Sullivan et al. | 370/503 |
| 2003/0219014 A1* | 11/2003 | Kotabe et al. | 370/375 |
| 2004/0234000 A1* | 11/2004 | Page | 375/259 |
| 2006/0034295 A1 | 2/2006 | Cherukuri et al. | |
| 2006/0161647 A1* | 7/2006 | Wojtkiewicz et al. | 709/224 |
| 2007/0189184 A1 | 8/2007 | Ryu et al. | |
| 2007/0271335 A1* | 11/2007 | Bostick et al. | 709/204 |
| 2007/0280239 A1 | 12/2007 | Lund | |
| 2008/0080562 A1 | 4/2008 | Burch et al. | |
| 2008/0117938 A1 | 5/2008 | Erich et al. | |
| 2008/0225841 A1 | 9/2008 | Conway et al. | |
| 2009/0073889 A1* | 3/2009 | Radulescu | 370/252 |
| 2009/0122711 A1* | 5/2009 | Soomro et al. | 370/252 |
| 2009/0154365 A1* | 6/2009 | Diab et al. | 370/248 |
| 2009/0249141 A1* | 10/2009 | Yasuda | 714/724 |
| 2010/0115316 A1* | 5/2010 | Diab | 713/323 |
| 2010/0309932 A1 | 12/2010 | Diab et al. | |
| 2010/0332886 A1* | 12/2010 | Tran et al. | 713/324 |

FOREIGN PATENT DOCUMENTS

| | | |
|---|---|---|
| EP | 1 494 407 | 1/2005 |
| GB | 2 337 672 | 11/1999 |
| WO | WO 00/31923 | 6/2000 |

OTHER PUBLICATIONS

Yi-Chin Chu, Serial-Gmii Specification, Jul. 19, 2001, Cisco Systems, Revision 1.7, p. 1-10.*

Grow, "802.1 and Energy Efficient Ethernet." Sep. 11, 2007, pp. 1-6, XP002509616.

Bennett et al., "Energy Efficient Ethernet." Jul. 16, 2007, pp. 1-70, XP002509615.

Gupta et al., "Dynamic Ethernet Link Shutdown for Energy Conservation on Ethernet Links." XP-002524616, pp. 6156-6161.

Wael Diab, "Energy Efficient Ethernet and 802.1." IEEE 802 Plenary, Nov. 16, 2007, XP-002524617.

Johas Teener, Michael D. "Audio/Video Bridging for Home Networks (IEEE 802.1 AV Bridging Task Group)" Joint ITU-T/IEEE Workshop on Carrier-class Ethernet. Geneva, May 31-Jun. 1, 2007. 25 Pages.

* cited by examiner

METHOD AND SYSTEM FOR DETERMINING PHYSICAL LAYER TRAVERSAL TIME

CROSS-REFERENCE TO RELATED APPLICATIONS/INCORPORATION BY REFERENCE

This patent application makes reference to, claims priority to and claims benefit from U.S. Provisional Patent Application Ser. No. 61/157,435 filed on Mar. 4, 2008.

The above stated application is hereby incorporated by reference in its entirety.

FIELD OF THE INVENTION

Certain embodiments of the invention relate to networking. More specifically, certain embodiments of the invention relate to a method and system for determining physical layer traversal time.

BACKGROUND OF THE INVENTION

With the increasing popularity of electronics such as desktop computers, laptop computers, and handheld devices such as smart phones and PDA's, communication networks, and in particular Ethernet networks, are becoming an increasingly popular means of exchanging data of various types, sizes for a variety of applications. In this regard, Ethernet networks are increasingly being utilized to carry, for example, voice, data, and multimedia. In this regard, people are relying more and more on the Internet and associated protocols such as Ethernet for the delivery of real-time and/or high quality content and/or information. However, delivery of such time-sensitive information creates a serious burden on networks and network designers.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for method and system for determining physical layer traversal time, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for determining physical layer traversal time. In various embodiments of the invention, duration of a time interval may be determined in the PHY of a network device, where the time interval corresponds to an amount of time that occurs between a first time instant at which information is input to the PHY and a second time instant at which corresponding information is output by the PHY. Communication of data to and/or from the network device may be managed based on the determined duration of the time interval. The duration of the time interval may be determined utilizing one or more counters within the PHY. The determined duration may be stored in one or more registers within the PHY. The registers within the PHY may be accessible via a management data input/output (MDIO) bus. The determined duration of the time interval may be communicated to a networking subsystem and/or a host of the network device via a data bus and/or one or more discrete signals. The networking subsystem and/or the host may calculate one or more of per-bit, per-byte, and/or per-packet PHY traversal times for ingress and/or egress traffic. The networking subsystem and/or the host may calculate different PHY traversal times for different data types, different source and/or destination applications, and/or different communication protocols. The first time instant and/or the second time instant may be determined based on a distinct and/or particular symbol, packet, code, or other signal. An amount of data that is processed by the PHY during the time interval may be determined within the PHY. For example, the amount of data that is processed by the PHY during the time interval may be determined by controlling one or more counters within the PHY.

Figure 1A:
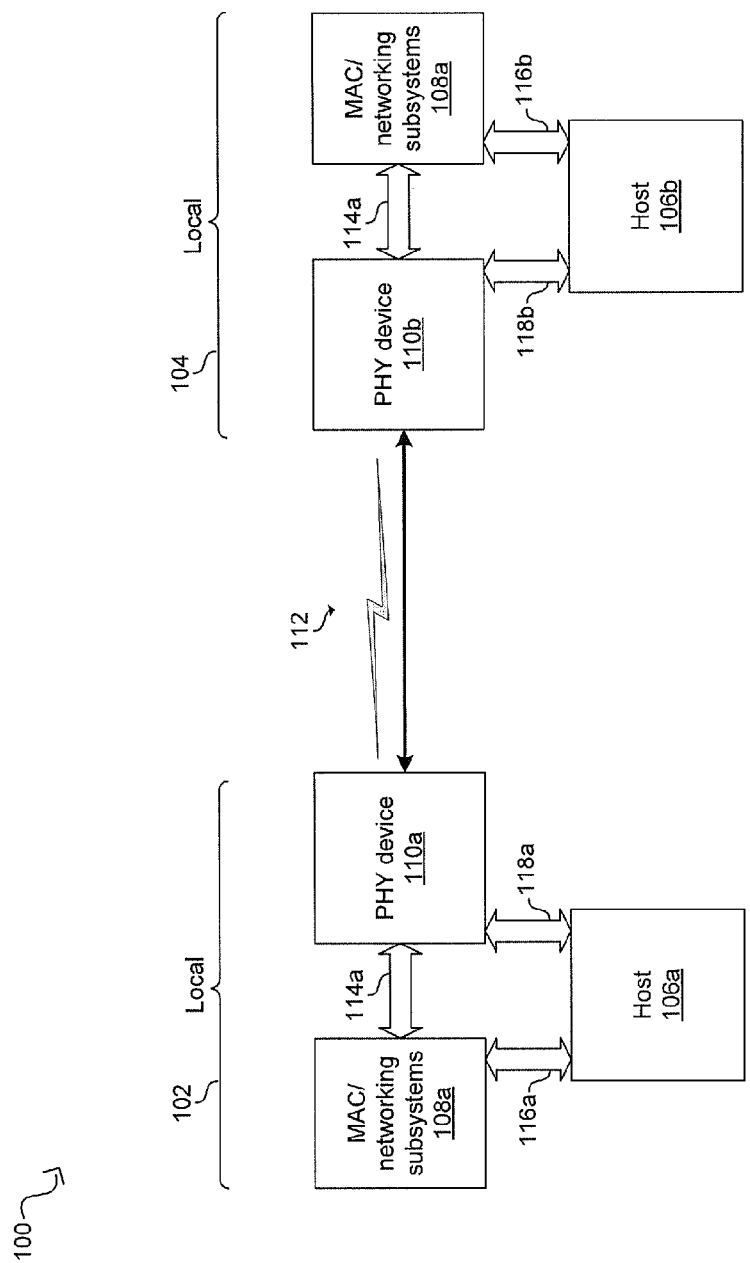
FIG. 1A is a diagram illustrating timing associated with communication of data across a network link, in accordance with an embodiment of the invention.

FIG. 1A is a block diagram illustrating an exemplary Ethernet connection between a two network devices, in accordance with an embodiment of the invention. Referring to FIG. 1A, there is shown a system 100 that comprises a network device 102 and a network device 104. The network devices 102 and 104 may be link partners that communicate via the link 112 and may comprise, respectively, hosts 106a and 106b, networking subsystems 108a and 108b, PHY devices 110a and 110b, interfaces 114a and 114b, interfaces 116a and 116b, and interfaces 118a and 118b. The interfaces 114a and 114b are referenced collectively or separately herein as interface(s) 114, and the interfaces 116a and 116b are referenced collectively or separately herein as interface(s) 116. The hosts 106a and 106b are referenced collectively or separately herein as host(s) 106. The networking subsystems 108a and 108b are referenced collectively or separately herein as networking subsystem(s) 108. The PHY devices 110a and 110b are referenced collectively or separately herein as PHY device(s) 106.

The link 112 is not limited to any specific medium. Exemplary link 112 media may comprise copper, optical, wireless, and/or backplane media. For example, a copper medium such as STP, Cat3, Cat 5, Cat 5e, Cat 6, Cat 7 and/or Cat 7a as well as ISO nomenclature variants may be utilized. Additionally, copper media technologies such as InfiniBand, Ribbon, and backplane may be utilized. With regard to optical media for the link 112, single mode fiber as well as multi-mode fiber may be utilized. With regard to wireless, the network devices 102 and 104 may support one or more of the 802.11 family of protocols. In an exemplary embodiment of the invention, the link 112 may comprise up to four or more physical channels, each of which may, for example, comprise an unshielded twisted pair (UTP). The network device 102 and the network device 104 may communicate via two or more physical channels comprising the link 112. For example, Ethernet over twisted pair standards 10BASE-T and 100BASE-TX may utilize two pairs of UTP while Ethernet over twisted pair standards 1000BASE-T and 10GBASE-T may utilize four pairs of UTP.

The network devices 102 and/or 104 may comprise, for example, switches, routers, end points, routers, computer systems, audio/video (A/V) enabled equipment, or a combination thereof. In this regard, A/V equipment may, for example, comprise a microphone, an instrument, a sound board, a sound card, a video camera, a media player, a graphics card, or other audio and/or video device. Additionally, the network devices 102 and 104 may be enabled to utilize Audio/Video Bridging and/or Audio/video bridging extensions (collectively referred to herein as audio video bridging or AVB) for the exchange of multimedia content and associated control and/or auxiliary data.

The hosts 106a and 106b may be operable to handle functionality of OSI layer 3 and above in the network devices 102 and 104, respectively. The hosts 106a and 106b may be operable to perform system control and management, and may comprise hardware, software, or a combination thereof. The hosts 106a and 106b may communicate with the networking subsystems 108a and 108b via interfaces 116a and 116b, respectively. The hosts 106a and 106b may additionally exchange signals with the PHY devices 110a and 110b via interfaces 118a and 118b, respectively. The interfaces 116a and 116b may correspond to PCI or PCI-X interfaces. The interfaces 118a and 118b may comprise one or more discrete signals and/or communication busses. Notwithstanding, the invention is not limited in this regard.

Each networking subsystem 108 may comprise suitable logic, circuitry, and/or code that may be operable to handle functionality of OSI layer 2 and above layers in the network device 102. In this regard, each networking subsystem 108 may comprise a media access controller (MAC) and/or other networking subsystems. Each networking subsystem 108 may be operable to implement, switching, routing, and/or network interface card (NIC) functions. In various embodiments of the invention, each networking subsystem 108 may be operable to generate timestamps in accordance with protocols such as IEEE 1588 and AVB. Each networking subsystem 108 may be operable to implement Ethernet protocols, such as those based on the IEEE 802.3 standard, for example. Notwithstanding, the invention is not limited in this regard. In various embodiments of the invention, each networking subsystem 108 may be operable to determine and/or compensate for variable delays introduced by the PHY devices 110.

The networking subsystems 108 may communicate with the PHY devices 110 via the interfaces 114. The interfaces 114 may correspond to Ethernet interfaces that comprise protocol and/or link management control signals. The interfaces 114 may be multi-rate capable interfaces and/or media independent interfaces (MII). The interfaces 114 may comprise, for example, a media independent interface such as XGMII, GMII, or RGMII. Each of the interfaces 114 may comprise a signal to indicate that data from a networking subsystem 108 to a PHY device 110 is imminent on the corresponding interface 114. Such signals are referred to herein as transmit enable (TX_EN) signals. Each of the interfaces 114 may also comprise a signal to indicate that data from a PHY device 110 to a networking subsystem 108 is imminent on the corresponding interface 114. Such a signal is referred to herein as a receive data valid (RX_DV) signal. The interfaces 114 may also each comprise a control interface such as a management data input/output (MDIO) interface.

The PHY devices 110 may each comprise suitable logic, circuitry, interfaces, and/or code that may enable communication between the network device 102 and the network device 104. Each of the PHY devices 110 may be referred to as a physical layer transmitter and/or receiver, a physical layer transceiver, a PHY transceiver, a PHYceiver, or simply a PHY. The PHY devices 110a and 110b be integrated within a switch, a network controller, or any network device and may be operable to handle physical layer requirements, which include, but are not limited to, packetization, data transfer and serialization/deserialization (SERDES), in instances where such an operation is required. Data packets received by the PHY devices 110a and 110b from networking subsystems 108a and 108b, respectively, may include data and header information for each of the above six functional OSI layers. The PHY devices 110a and 110b may be configured to convert packets from the networking subsystems 108a and 108b into physical layer signals for transmission over the physical link 112.

The PHY devices 110 may each support, for example, Ethernet over copper, Ethernet over fiber, and/or backplane Ethernet operations. The PHY devices 110 may each enable multi-rate communications, such as 10 Mbps, 100 Mbps, 1000 Mbps (or 1 Gbps), 2.5 Gbps, 4 Gbps, 10 Gbps, or 40 Gbps, for example. In this regard, each of the PHY devices 110 may support standard-based data rate limits and/or non-standard data rate limits. Moreover, the PHY devices 110 may each support standard Ethernet link lengths or ranges of operation and/or extended ranges of operation. Each of the PHY devices 110 may enable communication between the network device 102 and the network device 104 by utilizing a link discovery signaling (LDS) operation that enables detection of active operations in the other network device. In this regard the LDS operation may be configured for supporting a standard Ethernet operation and/or an extended range Ethernet operation. Each of the PHY devices 110 may also support autonegotiation for identifying and selecting communication parameters such as speed and duplex mode.

One or both of the PHY devices 110 may comprise a twisted pair PHY capable of operating at one or more standard rates such as 10 Mbps, 100 Mbps, 1 Gbps, and 10 Gbps (10BASE-T, 100GBASE-TX, 1GBASE-T, and/or 10GBASE-T); potentially standardized rates such as 40 Gbps and 100 Gbps; and/or non-standard rates such as 2.5 Gbps and 5 Gbps.

One or both of the PHY devices 110 may comprise a backplane PHY capable of operating at one or more standard rates such as 10 Gbps (10GBASE-KX4 and/or 10GBASE-KR); and/or non-standard rates such as 2.5 Gbps and 5 Gbps.

One or both of the PHY devices 110 may comprise an optical PHY capable of operating at one or more standard rates such as 10 Mbps, 100 Mbps, 1 Gbps, and 10 Gbps; potentially standardized rates such as 40 Gbps and 100 Gbps; and/or non-standardized rates such as 2.5 Gbps and 5 Gbps. In this regard, the optical PHY may be a passive optical network (PON) PHY.

One or both of the PHY devices 110 may support multi-lane topologies such as 40 Gbps CR4, ER4, KR4; 100 Gbps CR10, SR10 and/or 10 Gbps LX4 and CX4. Also, serial electrical and copper single channel technologies such as KX, KR, SR, LR, LRM, SX, LX, CX, BX10, LX10 may be supported. Non standard speeds and non-standard technologies, for example, single channel, two channel or four channels may also be supported. Moreover, TDM technologies such as PON at various speeds may be supported by the network devices 102 and/or 104.

One or both of the PHY devices 110 may support transmission and/or reception at a high(er) data in one direction and transmission and/or reception at a low(er) data rate in the other direction. For example, the network device 102 may comprise a multimedia server and the network device 104 may comprise a multimedia client. In this regard, the network device 102 may transmit multimedia data, for example, to the network device 104 at high(er) data rates while the network device 104 may transmit control or auxiliary data associated with the multimedia content at low(er) data rates.

During transmission, each layer may add its own header to the data passed on from the interfacing layer above it. However, during reception, a compatible network device having a similar OSI stack may strip off the headers as the message passes from the lower layers up to the higher layers. Consequently, there may be propagation and/or processing delays associated with conveying data across an OSI layer and/or sublayers and the delay may depend on the data being communicated. Variable delays through the PHY devices 110 may cause difficulties because PHY devices are typically low-cost and/or low-complexity and cannot accurately control the delay or indicate the delay to the higher OSI layers. In this regard, the delay through the physical layer may vary with, for example, process, temperature, and/or voltage variations. Such undetermined variable delays may result in jitter and/or latency that may prevent a high guaranteed QoS. Accordingly, aspects of the invention may enable determining the delay through the physical layer and thus may enable achieving high guaranteed QoS.

The PHY devices 110 may each be configured to handle physical layer requirements, which include, but are not limited to, packetization, data transfer and serialization/deserialization (SERDES), in instances where such an operation is required. Data packets received by a PHY device 110 from a networking subsystem 108 may include data and header information for each of the above six functional OSI layers. The PHY devices 110 may be configured to convert packets from the networking subsystems 108 into physical layer signals for transmission over the link 112.

In operation, each of the PHY devices 110 may generate indications of its processing and/or propagation delays and the indications may be utilized to calculate the PHY traversal time. The indications may comprise, for example, values generated via one or more counters. In an exemplary embodiment of the invention, the counter(s) may start when a packet arrives at a PHY device 110 and may stop when the PHY device 110 has completed transmission of the corresponding physical signals. The indications may be communicated to a corresponding networking subsystem 108. In this regard, the indication(s) may be communicated to the networking subsystem 108 in the form of one or more discrete control signals, as a packet communicated over the interface 114, and/or as management data communicated over a MDIO interface, which may be part of the interface 114. The networking subsystems 108 may be operable to utilize the indication of PHY traversal time to determine ingress and/or egress PHY traversal time(s). The networking subsystems 108 and/or the hosts 106 may be operable to utilize the determined PHY traversal time to, for example, provide guaranteed QoS.

Figure 1B:
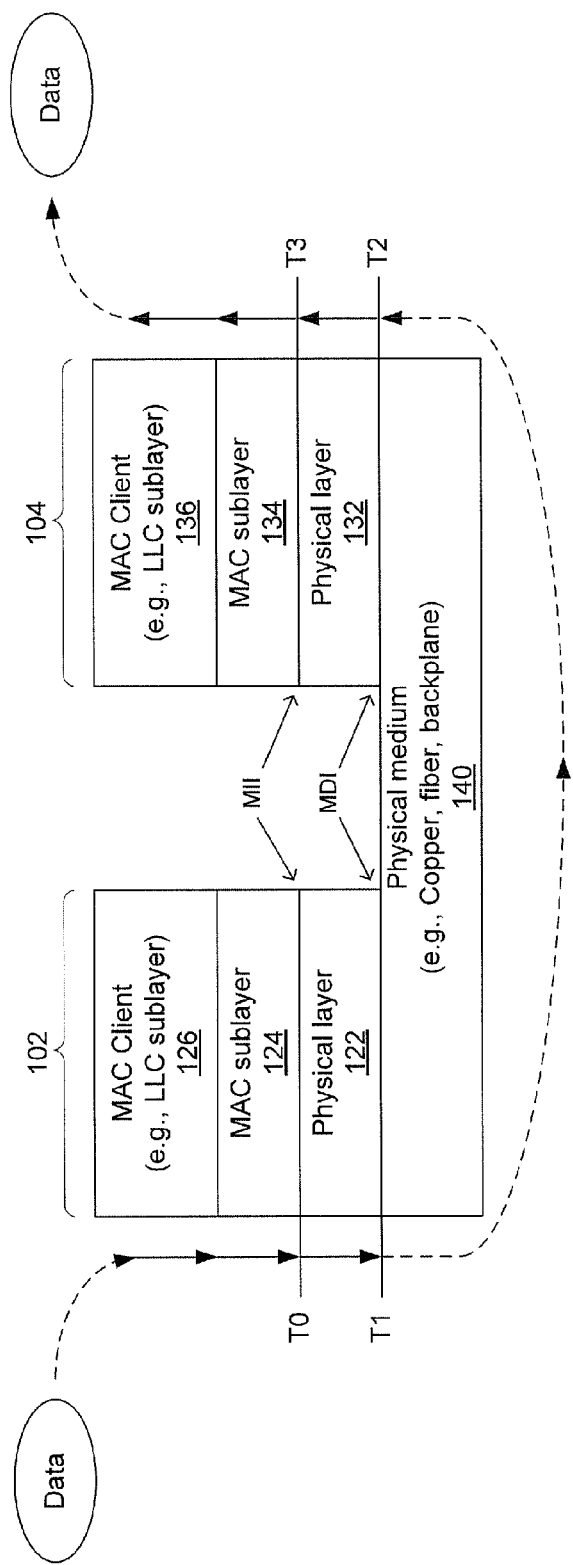
FIG. 1B is a diagram illustrating an exemplary physical layer device (PHY) operable to support determination of PHY traversal time, in accordance with an embodiment of the invention.

FIG. 1B is a diagram illustrating timing associated with communication of data across a network link, in accordance with an embodiment of the invention. Referring to FIG. 1B, there is shown data being communicated over a physical medium 140 from the first network device 102 to the second network device 104.

The physical medium 140 may comprise copper, optical, wireless, and/or backplane media. The network devices 102 and 104 may be as described with respect to FIG. 1B. The network devices 102 and 104 may comprise MAC client sublayers 126 and 136, MAC sublayers 124 and 134, and physical layers 122 and 132, respectively. The physical layers 122 and 132 may perform functions substantially similar to the PHY devices 110 described with respect to FIG. 1A.

The combination of the MAC client sublayer 126 and the MAC sublayer 124 may perform functions substantially similar to the network subsystem 108*a*, the interface 114*a*, and/or the interface 116*a* described with respect to FIG. 1. The combination of the MAC client sublayer 136 and the MAC sublayer 134 may perform functions substantially similar to the network subsystem 108*b*, the interface 114*b*, and/or the interface 116*b* described with respect to FIG. 1. The MAC client sublayers 126 and 136 may each, for example, implement multiplexing and flow control to enable multiple network layer protocols to coexist and utilize the MAC sublayers 124 and 134 and the physical layers 122 and 132, respectively. The MAC client sublayers 126 and 136 may each be, for example, the logical link control (LLC) sub-layer defined in IEEE 802.2. The MAC sublayers 124 and 134 may each perform data encapsulation and/or media access management, where media access management may comprise operations that handle conflicts arising from multiple network devices sharing a common physical medium. An exemplary operation may comprise arbitration and negotiation.

In operation, at time instant T0, data to be transmitted may be passed from the MAC sublayer 124 to the physical layer 122. From time instant T0 to time instant T1, the physical layer 122 may process the data and convert the data into physical layer signals.

At time instant T1, the physical signals generated by the physical layer 122 may be impressed onto the physical medium 140. In this regard, $\Delta T_{OUT}=(T1-T0)$ may be the amount of time required for egress data, e.g., an egress Ethernet frame, to be processed by, and propagate through, the physical layer 122.

From time instant T1 to time instant T2, the data may propagate along the physical medium 140. At time instant T2, the data may arrive at the physical layer 132 of the network device 104. The data may be passed up to the MAC sublayer 134 at time instant t3. In this regard, $\Delta T_{IN}=(T3-T2)$ may be the amount of time required for ingress data, for example, an ingress Ethernet frame, to be processed by, and propagate through, the physical layer 132.

In various exemplary embodiments of the invention, the network devices 102 and 104 may utilize one or more protocols, such as IEEE 1588 and/or the Audio Video Bridging (AVB) suite of protocols (e.g. IEEE 802.1AS), in an attempt to accurately determine the amount of time for data to be communicated from the network device 102 to the network device 104. However, protocols such as IEEE 1588 may only be enabled to generate timestamps at the MAC sublayer—time instants T0 and T3 in FIG. 1—and thus variation in the amount of time required for data to traverse the physical layers 122 and 132 may result in inaccuracies or inconsistency in the determination of path timing. Accordingly, aspects of the invention may enable determining the times $\Delta T_{OUT}$ and/or $\Delta T_{IN}$ for each of the network devices. In this regard, aspects of the invention may enable determining the processing and/or propagation time of the physical layers 122 and 132 for ingress and/or egress data.

Figure 2:
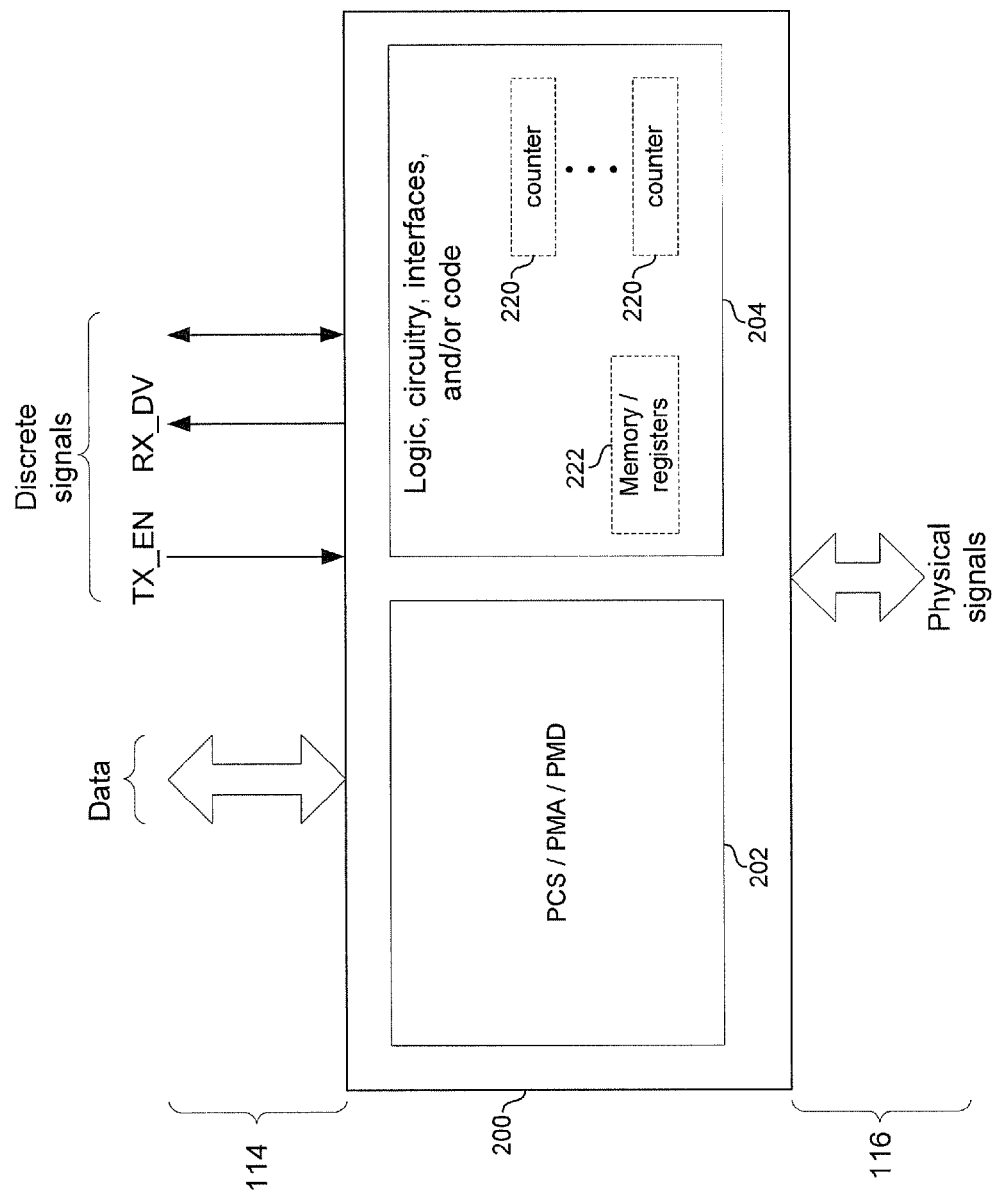
FIG. 2 is a diagram illustrating an exemplary physical layer device (PHY) operable to support determination of PHY traversal time, in accordance with an embodiment of the invention.

FIG. 2 is a diagram illustrating an exemplary physical layer device (PHY) operable to support determination of PHY traversal time, in accordance with an embodiment of the invention. Referring to FIG. 2, there is shown a PHY 200 comprising suitable logic, circuitry, interfaces, and or code, represented as module 202, for performing conventional physical layer functions. In this regard, the module 202 may be operable to implement physical coding sublayer (PCS), physical medium attachment (PMA) sublayer, and physical medium dependant (PMD) sublayer functions. The PHY 200 may additionally comprise suitable logic, circuitry, interfaces, and/or code, represented as module 204, that may enable determination of time required for ingress and/or egress data to be processed by and/or propagate through the sublayers and/or functions represented by the module 202.

The module 204 may comprise one or more counters 220 that may be operable to keep track of time and/or keep track of an amount of data traversing the PHY 200. The amount of data may be, for example, a frame size. In some embodiments of the invention, counts may be performed on data having a fixed or known size to determine traversal times. For example, the data may comprise maximum sized Ethernet frames. In this regard, the known length of the data may enable determining, for example, per-bit, per-symbol, per-byte, or per-packet traversal times. In an exemplary embodiment of the invention, several packets of known length may be communicated, and the traversal times may be determined, during connection setup. In this manner, a network device communicating data over the connection may take advantage of the known traverse times to provide guaranteed QoS. Furthermore, traversal times determined for the PHY 200 may be communicated to other network devices utilizing one or more protocols similar to, or operating as an addition to, link layer discovery protocol (LLDP).

The module 204 may additionally comprise one or more registers and/or memory elements 222. The registers 222 may, for example, store counter values and/or parameters for determining traversal times. The parameters may be accessible and/or configured, for example, by a network administrator and/or via a management data input/output (MDIO) bus.

Also, the module 204 may be operable to detect specific symbols, codes, characters, packets, and/or other signals on the interface 114 to a MAC and/or on an interface 116 to a physical medium. Detection of a specific symbol, code, character, packet, and/or other signal may trigger one or more operations associated with determining the PHY 200 traversal time. For example, receiving a specific code on the interface 114 may trigger the module 204 to count the traversal time of a subsequent packet. In this regard, the detected code may indicate that a packet of known size will be subsequently communicated to the PHY 200 via the interface 114 and thus the counter result may be correlated to the amount of data processed by the PHY 200 during that time. Additionally, triggering calculation of PHY traverse time based on an indication such as particular code, symbol, packet, or signal may enable associating PHY traversal times with various data types, source applications generating data, destination applications receiving data, and/or protocols utilized to communicate data. In this regard, some data may be processed and/or propagate through a PHY faster than other data and determining different PHY traverse times for each type, application, and/or protocol may enable accounting for such variance.

Although the modules 202 and 204 are illustrated as separate, the invention is not so limited and various functions of the module 202 and 204 may be implemented by shared logic, circuitry, interfaces, and/or code. Also, although the counters are depicted as being integrated within the PHY 200, the invention is not so limited and the counters may be integrated in the PHY, in functions and/or modules operating at higher OSI layers, and/or in a combination thereof.

Figure 3A:
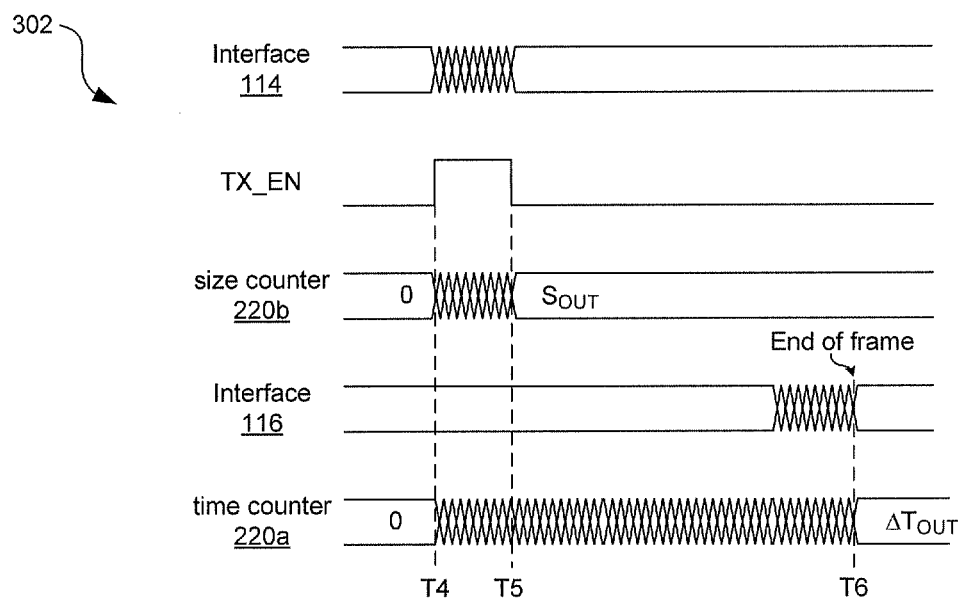
FIG. 3A is a timing diagram illustrating determination of PHY traversal time for egress traffic, in accordance with an embodiment of the invention.

FIG. 3A is a timing diagram illustrating determination of PHY traversal time for egress traffic, in accordance with an embodiment of the invention. Referring to FIG. 3A, the timing diagram 302 illustrates utilizing a time counter 220a and a size counter 220b to determine egress traversal time for the PHY 200.

At time instant T4, data may begin arriving at the PHY 200 via the interface 114. In this regard, a time counter 220a and a size counter 220b may begin counting upon detecting assertion of a transmit enable (TX_EN) on the interface 114. At time instant T5, upon de-assertion of TX_EN, the size counter 220b may stop its count. In this manner, the value $S_{OUT}$ stored in the size counter 220b at time instant T5 may correspond to the amount of data to be transmitted by the PHY 200. At time instant T6, upon detecting transmission of an end-of-frame delimiter onto the physical medium, the time counter 220a may stop its count. In this manner, the value $\Delta T_{OUT}$ stored in the time counter 220a at time instant T6 may correspond to the amount of time it took the PHY 200 to transmit the data onto the physical medium. Accordingly, $S_{OUT}$ and $\Delta T_{OUT}$ may be utilized, for example, to allocate network resources, schedule transmissions, and/or otherwise manage communications to provide guaranteed QoS. In this regard, $S_{OUT}$ and/or $\Delta T_{OUT}$ may be communicated up to a MAC controller, or other networking subsystem, via an interface 114 and/or communicated to other network devices to which the PHY 200 is communicatively coupled.

Figure 3B:
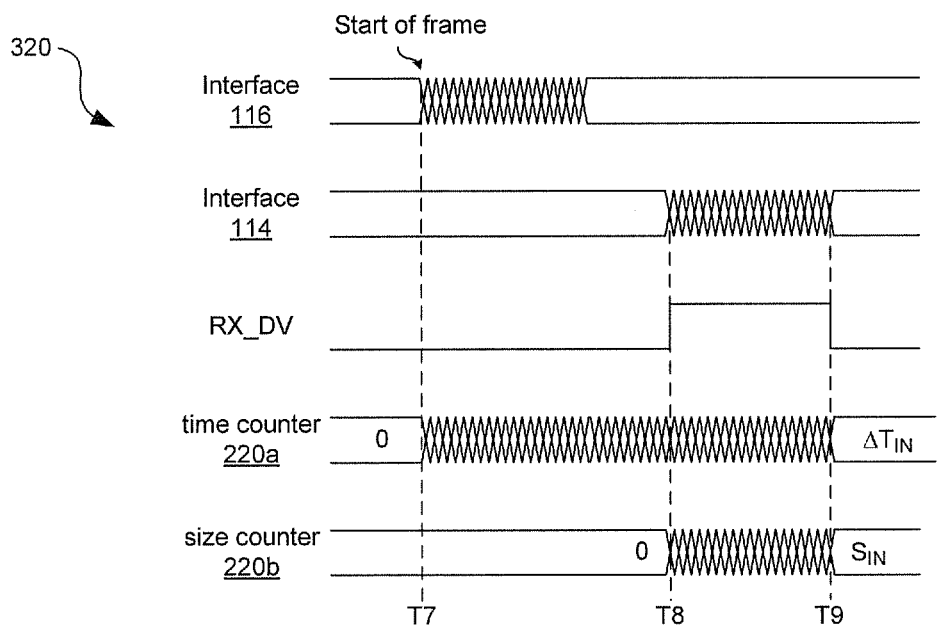
FIG. 3B is a timing diagram illustrating determination of PHY traversal time for ingress traffic, in accordance with an embodiment of the invention.

FIG. 3B is a timing diagram illustrating determination of PHY traversal time for ingress traffic, in accordance with an embodiment of the invention. Referring to FIG. 3B, the timing diagram 320 illustrates utilizing a time counter 220a and a size counter 220b to determine egress traversal time for the PHY 200.

At time instant T7, upon detecting a start-of-frame delimiter on the interface 116, a time counter 220a may begin counting. At time instant T8, the size counter 220b may begin counting when the PHY asserts receive data valid (RX_DV). At time instant T9, upon de-assertion of the RX_DV signal, the time counter 220a and the size counter 220b may each stop counting. In this manner, the value $S_{IN}$ stored in the size counter 220b may correspond to an amount of data received by the PHY 200 and the value $\Delta T_{IN}$ stored in the time counter 220a may correspond to the amount of time it took the PHY 200 to transmit and amount, $S_{IN}$, of data. Accordingly, $S_{IN}$ and $\Delta T_{IN}$ may be utilized to allocate network resources, schedule transmissions, and/or otherwise manage communications to provide guaranteed QoS. In this regard, $S_{IN}$ and/or $\Delta T_{IN}$ may be communicated to a MAC controller, or other networking subsystem, via an interface 114 and/or communicated to other network devices to which the PHY 200 is communicatively coupled.

Figure 3C:
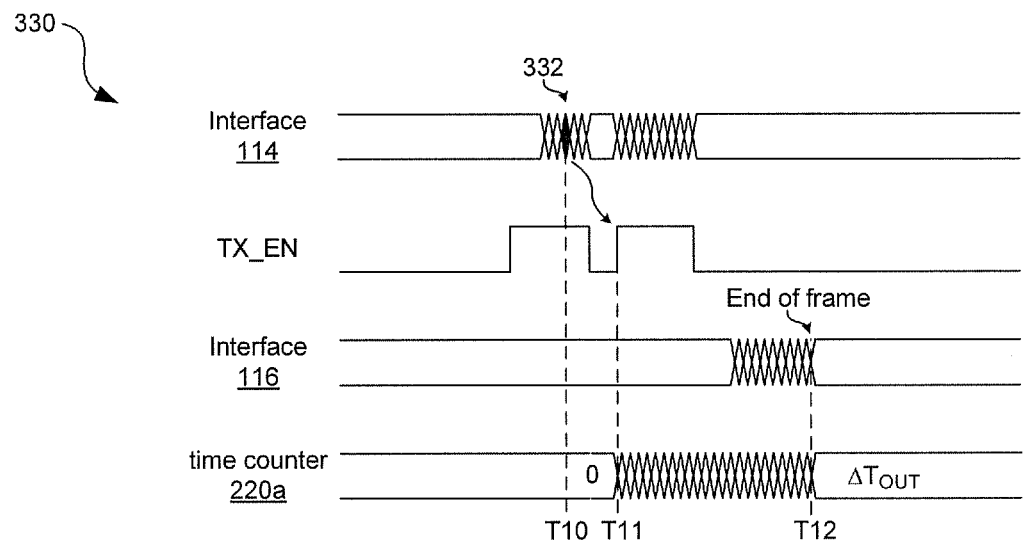
FIG. 3C is a timing diagram illustrating determination of PHY traversal time for an indentified egress packet, in accordance with an embodiment of the invention.

FIG. 3C is a timing diagram illustrating determination of PHY traversal time for an indentified egress packet, in accordance with an embodiment of the invention. Referring to FIG. 3C, the timing diagram 330 illustrates utilizing a time counter 220a to determine egress traversal time for the PHY 200.

At time instant t10, the PHY 200 may detect a triggering event 332 on the interface 114. This triggering event may be reception of a unique or particular symbol, code, packet, and/or other signal that may trigger the PHY 200 to perform a time count on the subsequent egress packet arriving at the PHY via the interface 114. The indication 332 may indicate that a packet of a determined size will be arriving on the interface 114 and thus a size counter may be unnecessary. Accordingly, at time instant T11 when the subsequent packet begins arriving on the interface 114, the time counter 220a may begin counting. At time instant T12, upon detecting an end-of-frame delimiter on the interface 116, the time counter 220a may stop counting. In this manner, the value $\Delta T_{OUT}$ stored in the time counter 220a at time instant T12 may correspond to the amount of time it took the PHY 200 to transmit the specified packet.

Figure 3D:
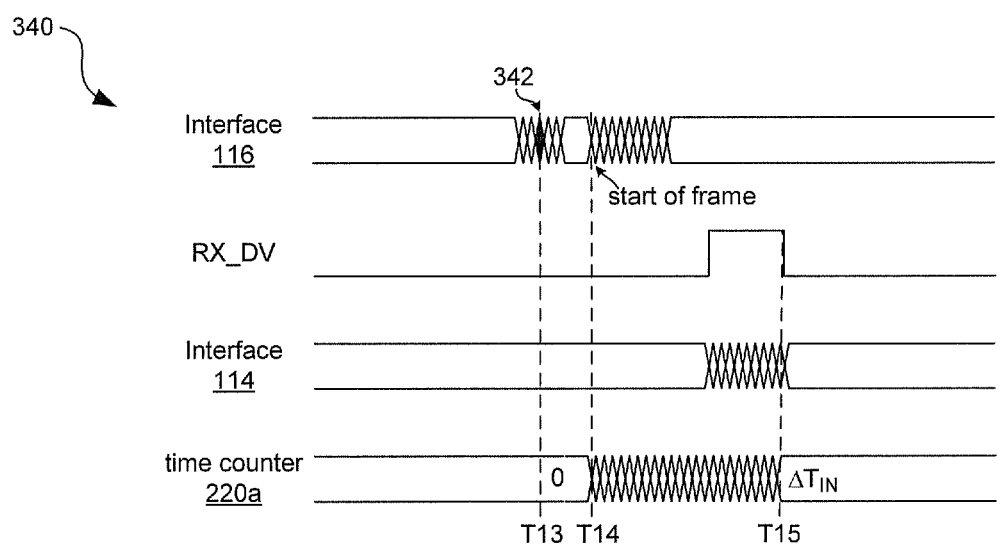
FIG. 3D is a timing diagram illustrating determination of PHY traversal time for an indentified ingress packet, in accordance with an embodiment of the invention.

FIG. 3D is a timing diagram illustrating determination of PHY traversal time for an indentified ingress packet, in accordance with an embodiment of the invention. Referring to FIG. 3D, the timing diagram 340 illustrates utilizing a time counter 220a to determine egress traversal time for the PHY 200.

At time instant T13, the PHY 200 may detect a triggering event 342 on the interface 116. This triggering event 342 may be reception of a unique or particular symbol, code, packet, and/or other signal that may trigger the PHY 200 to perform a time count on the subsequent ingress packet arriving at the PHY via the interface 116. The indication 342 may indicate that a packet of a determined size will be arriving on the interface 116 and thus a size counter may be unnecessary. Accordingly, at time instant T14, when the subsequent packet begins arriving on the interface 116, the time counter 220a may begin counting. At time instant T15, upon de-assertion of RX_DV, the time counter 220a may stop counting. In this regard, RX_DV may be de-asserted when the PHY 200 has completed processing and communicating the data up to the MAC, or other networking subsystem, via the interface 114. In this manner, the value $\Delta T_{IN}$ stored in the time counter 220a at time instant T15 may correspond to the amount of time it took the PHY 200 to transmit the specified packet.

Figure 4:
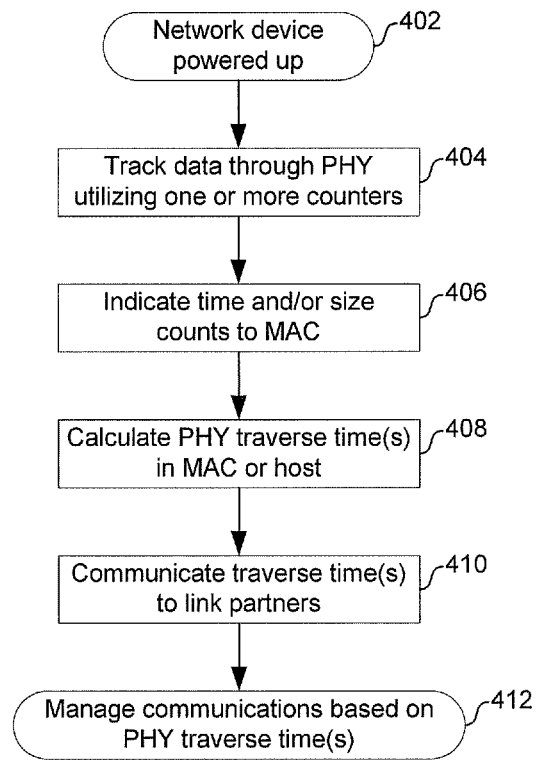
FIG. 4 is a flowchart illustrating exemplary steps for determining PHY traversal time to enable guaranteed quality of service (QoS) in a network, in accordance with an embodiment of the invention.

FIG. 4 is a flowchart illustrating exemplary steps for determining PHY traversal time to enable guaranteed quality of service (QoS) in a network, in accordance with an embodiment of the invention. Referring to FIG. 4, the exemplary steps may begin with step 402 when a network device, such as the network devices 102 and 104, are powered up. Subsequent to step 402, the exemplary steps may advance to step 404.

In step 404, the network devices 102 and 104 may each determine PHY traversal times for ingress and/or egress traffic. In this regard, the PHY devices 110 may each comprise one or more counters for tracking the reception and/or transmission of data. Subsequent to step 404, the exemplary steps may advance to step 406.

In step 406, values stored in one or more counters in the PHY devices 110 may conveyed to the networking subsystem 108 and/or the hosts 106 via one or both of the interfaces 114 and 116. In this regard, the count values may be conveyed via one or more packets and/or via one or more discrete signals. In an exemplary embodiment of the invention, the count values may be stored in registers and read via a MDIO interface. Subsequent to step 406, the exemplary steps may advance to step 408.

In step 408, the networking subsystem 108 and/or host 106 may be operable to utilize count values from the PHY devices 110 to calculate PHY traverse times based on count values received from the PHY devices 110. In various embodiments of the invention, the PHY traverse time may be calculated as, for example, per-bit, per-byte, per-symbol, and/or per-packet times. In some embodiments of the invention, PHY traversal times for ingress data may be calculated separately from egress data. In some embodiments of the invention, different PHY traverse times may be calculated for different data types, different source and/or destination applications, and/or for different protocols utilized to communicate data. Subsequent to step 408, the exemplary steps may advance to step 410.

In step 410, the calculated PHY traversal times may be communicated to link partners communicatively coupled to link partners. For example, PHY traversal times calculated in the network device 102 may be communicated to the network device 104 and PHY traversal times calculated in the network device 104 may be communicated to the network device 102. In various embodiments of the invention, the PHY traversal times may be communicated utilizing a protocol such as LLDP and/or may be communicated as an enhancement and/or modification of the protocol. Other information and/or parameters, such as traversal time requirements and/or latency requirements of one or more protocols, may be communicated along with the PHY traversal time. Additionally, the PHY traversal time may be combined with MAC traversal time and/or traversal time of higher OSI layers, and the combined and/or aggregate traversal time may be communicated to link partners. In some instances, combined traversal times of the PHY and higher OSI layers may be communicated to link partners in the form of an adjusted timestamp. Subsequent to step 410, the exemplary steps may advance to step 412.

In step 412, network communications may be managed based on the calculated PHY traversal times. For example, a network device may plan transmission times and/or buffering to account for PHY traversal times along a network time. Similarly, a network device may account for PHY traversal times when determining latency and/or jitter. Also, timestamps may be adjusted based on one or more determined PHY traversal times. In this manner, knowledge of PHY traversal times may enable network devices to accurately determine timing parameters of a network and thus accurately predict a QoS that may be provided.

Various aspects of a method and system for determining physical layer traversal time are provided. In an exemplary embodiment of the invention, duration of a time interval may be determined in a PHY 110 of a network device 102, where the time interval corresponds to an amount of time that occurs between a first time instant at which information is input to the PHY 110 and a second time instant at which corresponding information is output by the PHY 110. Communication of data to and/or from the network device 102 may be managed based on the determined duration of the time interval. The duration of the time interval may be determined utilizing one or more counters 220 within the PHY 110. The determined duration may be stored in one or more registers 222 within the PHY 110. The registers 222 within the PHY 110 may be accessible via a management data input/output (MDIO) bus. The determined duration of the time interval may be communicated to a networking subsystem 108 and/or a host 106 of the network device 102 via a data bus and/or one or more discrete signals. The networking subsystem 108 and/or the host 106 may calculate one or more of per-bit, per-byte, and/or per-packet PHY traversal times for ingress and/or egress traffic. The networking subsystem 108 and/or the host 106 may calculate different PHY traversal times for different data types, different source and/or destination applications, and/or different communication protocols. The first time instant and/or the second time instant may be determined based on a distinct and/or particular symbol, packet, code, or other signal. An amount of data that is processed by the PHY 110 during the time interval may be determined within the PHY 110. For example, the amount of data that is processed by the PHY 110 during the time interval may be determined by controlling one or more counters 220 within the PHY 110.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for determining physical layer traversal time.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for networking, the method comprising:
   determining, in a PHY of a network device, a duration of a time interval that occurs between a first time instant at which information is input to said PHY and a second time instant at which corresponding information is output by said PHY to another device via an external physical link, the another device being communicatively coupled to said network device, said first time instant determined according to a transit enable signal input to said PHY from a host device via a local interface between said network device and said host device, said transit enable signal being distinct from said information and said external physical link being different than said local interface;
   transmitting the determined duration of said time interval to the another device via said external physical link; and
   managing communications of data to said network device and communications from said network device according to said determined duration of said time interval.

2. The method according to claim 1, further comprising: determining said duration of said time interval by utilizing one or more counters within said PHY.

3. The method according to claim 1, further comprising: storing said determined duration in one or more registers within said PHY.

4. The method according to claim 3, further comprising: accessing said one or more registers via a management data input/output (MDIO) bus.

5. The method according to claim 1, further comprising: communicating said determined duration to a networking subsystem or to the host device via one or more discrete signals over a data bus.

6. The method according to claim 5, wherein said networking subsystem or said host device calculates one or more of per-bit, per-byte, and per-packet PHY traversal times for ingress and egress traffic.

7. The method according to claim 5, wherein said networking subsystem or said host device calculates different PHY traversal times for different data types, different source and/or destination applications, and different communication protocols.

8. The method according to claim 1, further comprising: determining, in said PHY, an amount of data that is processed by said PHY during said time interval.

9. The method according to claim 8, further comprising: controlling one or more counters within said PHY to enable said determining of said amount of data that is processed by said PHY during said time interval.

10. The method according to claim 8, further comprising: storing said amount of data in one or more registers within said PHY.

11. A system for networking, the system comprising:
   circuitry for use in a PHY of a network device, said circuitry configured to:
      determine a duration of a time interval that occurs between a first time instant at which information is input to said PHY and a second time instant at which corresponding information is output by said PHY to another device via an external physical link, the another device being communicatively coupled to said network device, said first time instant determined according to a transmit enable signal input to said PHY from a host device via a local interface between said network device and said host device, said transit enable signal being distinct from said information and said external physical link being different than said local interface,
      transmit the determined duration of said time interval to the another device via said external physical link, and
      manage communications of data to said network device and communications from said network device according to said determined duration of said time interval.

12. The system according to claim 11, wherein said circuitry utilizes one or more counters to determine said duration of said time interval.

13. The system according to claim 11, wherein said circuitry stores said determined duration in one or more registers.

14. The system according to claim 13, wherein said one or more registers are accessible via a management data input/output (MDIO) bus.

15. The system according to claim 13, wherein said circuitry stores said amount of data in one or more registers within said PHY.

16. The system according to claim 11, wherein said circuitry communicates said determined duration to a networking subsystem or to the host device via one or more discrete signals over a data bus.

17. The system according to claim 16, wherein said networking subsystem or said host device calculates one or more of per-bit, per-byte, and per-packet PHY traversal times for ingress and egress traffic.

18. The system according to claim 16, wherein said networking subsystem or said host device calculates different PHY traversal times for different data types, different source and/or destination applications, and different communication protocols.

19. The system according to claim 11, wherein said circuitry determines an amount of data that is processed by said PHY during said time interval.

20. The system according to claim 19, wherein said circuitry controls one or more counters to determine said amount of data that is processed by said PHY during said time interval.

* * * * *